(12) United States Patent
Ishii et al.

(10) Patent No.: US 10,651,458 B2
(45) Date of Patent: *May 12, 2020

(54) NEGATIVE ELECTRODE FOR LITHIUM SECONDARY BATTERY AND LITHIUM SECONDARY BATTERY

(75) Inventors: Yoshito Ishii, Hitachi (JP); Souichirou Suda, Hitachi (JP); Tatsuya Nishida, Hitachi (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/914,215

(22) Filed: Oct. 28, 2010

(65) Prior Publication Data

US 2011/0045353 A1    Feb. 24, 2011

Related U.S. Application Data

(63) Continuation of application No. 10/586,304, filed as application No. PCT/JP2004/000301 on Jan. 16, 2004, now Pat. No. 7,906,240.

(51) Int. Cl.
| | |
|---|---|
| H01M 4/04 | (2006.01) |
| H01M 4/133 | (2010.01) |
| H01M 4/1393 | (2010.01) |
| H01M 4/587 | (2010.01) |
| C01B 32/20 | (2017.01) |
| H01M 4/02 | (2006.01) |
| H01M 10/0525 | (2010.01) |

(52) U.S. Cl.
CPC ............. *H01M 4/043* (2013.01); *C01B 32/20* (2017.08); *H01M 4/0404* (2013.01); *H01M 4/133* (2013.01); *H01M 4/1393* (2013.01); *H01M 4/587* (2013.01); *H01M 4/02* (2013.01); *H01M 10/0525* (2013.01); *H01M 2004/021* (2013.01)

(58) Field of Classification Search
CPC ........ H01M 4/583; H01M 4/04; H01M 4/043; H01M 4/133; H01M 4/1393; H01M 4/587; H01M 4/0404; H01M 4/02; H01M 10/0525; H01M 2004/021; C01B 32/20
USPC ...................... 429/231.8, 217, 223
See application file for complete search history.

(56) References Cited

U.S. PATENT DOCUMENTS

| | | | | |
|---|---|---|---|---|
| 5,721,069 A | * | 2/1998 | Shoji ................... | H01M 4/0404 204/290.11 |
| 6,139,990 A | | 10/2000 | Kubota et al. | |
| 6,344,296 B1 | | 2/2002 | Ishii et al. | |
| 6,403,259 B1 | | 6/2002 | Kitagawa et al. | |
| 6,444,365 B2 | | 9/2002 | Ishii et al. | |
| 6,455,199 B1 | * | 9/2002 | Kitagawa et al. ......... | 429/231.8 |
| 6,656,642 B2 | | 12/2003 | Hamamoto et al. | |
| 2001/0033822 A1 | | 10/2001 | Ishii et al. | |

FOREIGN PATENT DOCUMENTS

| | | |
|---|---|---|
| EP | 1 528 616 | 5/2005 |
| JP | 57-208079 | 12/1982 |
| JP | 05-290833 | 11/1993 |
| JP | H06-295725 | 10/1994 |
| JP | H07-134988 | 5/1995 |
| JP | 09259884 A * | 10/1997 |
| JP | H10-158005 | 6/1998 |
| JP | 10-236808 | 9/1998 |
| JP | 10-255767 | 9/1998 |
| JP | 11-217266 | 8/1999 |
| JP | 11-263612 | 9/1999 |
| JP | 11-283622 | 10/1999 |
| JP | 11-288716 | 10/1999 |
| JP | 11-317229 | 11/1999 |
| JP | 2000-182617 | 6/2000 |
| JP | 2000-260479 | 9/2000 |
| JP | 2000-323124 | 11/2000 |
| JP | 2001-114505 A | 4/2001 |
| JP | 2001-283844 | 10/2001 |
| JP | 2002-175807 | 6/2002 |
| JP | 2002-222648 | 8/2002 |
| JP | 2003-31218 | 1/2003 |
| JP | 2003-197182 | 7/2003 |
| JP | 2003-197182 A | 7/2003 |
| JP | 2003-297353 | 10/2003 |
| JP | 2003-297353 A | 10/2003 |
| JP | 2004-055139 | 2/2004 |

(Continued)

OTHER PUBLICATIONS

IPDL Machine Translation of JP 11-283622A (Oct. 1999).*
JP Office Action of Appln. No. 2002-206582 with translation.
EP Search Report of Appln. No. 04 702 821.2 dated May 4, 2010 in English.
Korean Office Action of Appln. No. 10-2006-701489 dated Jul. 29, 2010.
Japanese Office Action of Appln. No. 2008-265688 dated Jan. 10, 2012 with English translation.
Canadian Office Action of Application 2,553,707 dated Oct. 5, 2011 in English.

(Continued)

*Primary Examiner* — Gregg Cantelmo
(74) *Attorney, Agent, or Firm* — Fitch, Even, Tabin & Flannery, LLP

(57) ABSTRACT

A negative electrode for a lithium secondary battery includes a layer of a mixture containing graphite powder and an organic binder on a current collector, wherein a diffraction intensity ratio (002)/(110) measured by X-ray diffractometry of the layer of a mixture is 500 or less. A lithium secondary battery includes the negative electrode for a lithium secondary battery, and a positive electrode that includes a lithium compound. This results in less deterioration in the rapid charge and discharge characteristics and the cycle characteristics when the density of the negative electrode is made higher, thereby providing a high capacity lithium secondary battery having the improved energy density per unit volume of the secondary battery.

24 Claims, 1 Drawing Sheet

(56) References Cited

FOREIGN PATENT DOCUMENTS

| KR | 2000-0029812 | 5/2000 |
|---|---|---|
| WO | WO 02/059040 A1 | 8/2002 |
| WO | WO 2004/006379 | 1/2004 |

OTHER PUBLICATIONS

Korean Office Action of Appln. 9-5-2011-067425664 dated Nov. 18, 2011 with English translation.
JP Office Action of Appln. No. 2010-167177 dated Oct. 23, 2012 with English translation.
Korean Office Action of Appln. No. 10-2011-7017253 dated Oct. 30, 2012 with English translation.
Canadian Office Action, Canadian Patent Application No. 2,553,707, dated May 22, 2012.
Korean office action of Appln. No. 9-5-2013-027025523 dated Apr. 22, 2013 with English translation.
JP Office Action of Appln. No. 2012-054325 dated Sep. 3, 2013 with English translation.
JP Office Action of Appn. No. 2013-11042 dated Sep. 24, 2013 with English translation.
JP Office Action of Appln. No. 2010-167177 dated Mar. 12, 2013 with English translation.
JP Office Action of Appln. No. 2012-054325 dated Nov. 26, 2013 with English translation.
JP Office Action of Appln. No. 2012-054325 dated Apr. 8, 2014 with English translation.
Korean office action of Appln. 2011-7017253 dated May 23, 2014 with English translation.
JP Office Action of Appln. No. 2013-123780 dated Jun. 3, 2014 with English translation.
EP Office Action of Appln. No. 04 702 821. 2 dated Jul. 25, 2014 in English.
Korean Office of Appln. No. 9-5-2014-074072753 dated Oct. 29, 2014 with English translation.
JP Office Action of Appln. No. 2014-140282 dated Mar. 10, 2015 with English translation.
Decision of Trial of Korean Appln. No. 7002590 dated Sep. 8, 2015 with English translation.
Office Action of EP Appln. No. 04 702 821.2-1373 dated Feb. 1, 2016 in English.
Office Action of counterpart JP Appln. No. 2015-096331 dated Jun. 14, 2016 with English translation.
Office Action of JP Appln. No. 2016-200723 dated Feb. 14, 2017 with English translation.

* cited by examiner

NEGATIVE ELECTRODE FOR LITHIUM SECONDARY BATTERY AND LITHIUM SECONDARY BATTERY

CROSS-REFERENCE TO RELATED APPLICATION

This application is a continuation application of U.S. application Ser. No. 10/586,304, filed Jul. 14, 2006 now U.S. Pat. No. 7,906,240, issued on Mar. 15, 2011, the contents of which are incorporated herein by reference.

TECHNICAL FIELD

The present invention relates to a negative electrode for a lithium secondary battery and a lithium secondary battery. In more detail, the invention relates to a lithium secondary battery that can be suitably used in portable devices, electric automobiles and electricity storage and is high in capacity and excellent in the rapid charge and discharge characteristics and the cycle characteristics, and a negative electrode for obtaining the same.

BACKGROUND ART

In an existing negative electrode of a lithium secondary battery, for instance, natural graphite powders, artificial graphite powders obtained by graphitizing cokes, artificial graphite powders obtained by graphitizing organic polymers, pitch and so on, graphite powders obtained by pulverizing these, spherical graphite powders obtained by graphitizing mesophase carbon and so on can be used. The graphite powders are mixed with an organic binder and an organic solvent to form a graphite paste. The graphite paste is coated on a surface of a copper foil, followed by drying the solvent, and thereby used as a negative electrode for a lithium secondary battery.

For instance, as shown in Japanese Examined Patent Application Publication No. 62-23433, the use of graphite in a negative electrode enables to overcome a problem of internal short-circuiting owing to dendrite of lithium and thereby the cycle characteristics are improved.

However, in the natural graphite having developed graphite crystals, a bonding between graphite layers is cleaved owing to pulverization, since the interlayer bonding force of a crystal in a C-axis direction is weaker than a bonding force in a plane direction of the crystal, and thereby so-called scaly graphite powders large in the aspect ratio result. Since the scaly graphite is large in the aspect ratio, when it is kneaded together with a binder and coated on a current collector to form an electrode, the scaly graphite powders orient in a plane direction of the current collector. As a result, not only a charge and discharge capacity and the rapid charge and discharge characteristics are likely to be deteriorated, but also, internal destruction of the electrode is caused owing to expansion and contraction in a C-axis direction generated by repetition of absorption and release of lithium to the graphite crystal, and thereby the cycle characteristics are deteriorated. In addition, when density of the negative electrode is set at 1.45 $g/cm^3$ or more, lithium becomes difficult to be absorbed and released by negative electrode graphite, resulting in deteriorating the rapid charge and discharge characteristics, a discharge capacity per unit weight of the negative electrode and the cycle characteristics.

On the other hand, in a lithium secondary battery, it is expected that energy density per unit volume can be made larger by the higher density of the negative electrode. In this connection, a negative electrode that is less deteriorated in the rapid charge and discharge characteristics and the cycle characteristics when the density of the negative electrode is made higher in order to improve the energy density per unit volume of the lithium secondary battery is in demand.

The invention, in view of the above situations, intends to provide a negative electrode suitable for a lithium secondary battery excellent in the rapid charge and discharge characteristics and cycle characteristics and a negative electrode suitable for a high capacity lithium secondary battery.

DISCLOSURE OF INVENTION (1) The present invention relates to a negative electrode for a lithium secondary battery, which has a layer of a mixture containing graphite powder and an organic binder on a current collector, wherein a diffraction intensity ratio (002)/(110) measured by X-ray diffractometry of the layer of a mixture is 500 or less.

(2) Furthermore, the invention relates to the negative electrode for a lithium secondary battery, which is described in the (1) and in which density of the layer of the mixture containing graphite powder and the organic binder is in the range of 1.50 to 1.95 $g/cm^3$.

(3) Still furthermore, the invention relates to the negative electrode for a lithium secondary battery, which is described in the (1) or (2) and in which an average particle diameter of graphite powder is in the range of 1 to 100 μm and Lc (002), a crystallite size in a C-axis direction of a crystal, is 500 Å or more.

(4) Furthermore, the invention relates to a lithium secondary battery that includes the negative electrode for a lithium secondary battery according to any one of the (1) through (3) and a positive electrode that includes a lithium compound.

(5) Still furthermore, the invention relates to the lithium secondary battery described in the (4), in which the lithium compound includes at least Ni.

DESCRIPTION OF REFERENCE NUMERALS

Figure 1:
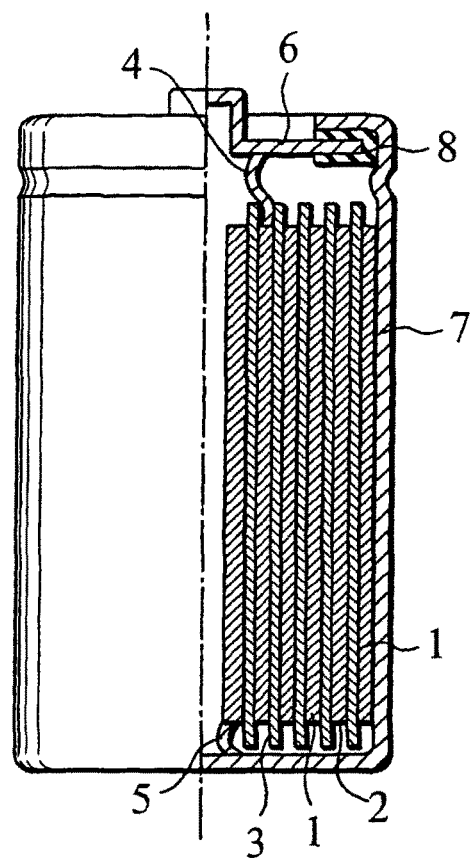
FIG. 1 is a schematic partial sectional front view showing an example of a lithium secondary battery according to the invention.

1: positive electrode
2: negative electrode
3: separator
4: positive electrode tab
5: negative electrode tab
6: positive electrode cap
7: battery canister
8: gasket
9: glass cell
10: electrolytic solution
11: sample electrode (negative electrode)
12: separator
13: counter electrode (positive electrode)
14: reference electrode

BEST MODE FOR CARRYING OUT THE INVENTION

A negative electrode for a lithium secondary battery according to the invention is a negative electrode for a lithium secondary battery, which has, on a current collector, a layer of a mixture that includes graphite powders and an organic binder, a diffraction intensity ratio (002)/(110) measured by X-ray diffractometry of the layer of the mixture including the graphite powder and the organic binder being 500 or less. The diffraction intensity ratio (002)/(110) is preferably in the range of 10 to 500, more preferably 10 to 400, still more preferably 10 to 300 and particularly preferably in the range of 50 to 200. When the diffraction intensity ratio (002)/(110) exceeds 500, the rapid charge and discharge characteristics and the cycle characteristics of a lithium secondary battery that is prepared deteriorate.

Here, the diffraction intensity ratio (002)/(110) of a layer of a mixture of the graphite powders and the organic binder can be obtained, by use of a formula (1) below, from intensities of a diffraction peak of a (002) plane detected in the proximity of a diffraction angle 2θ=26 to 27° and a diffraction peak of a (110) plane detected in the proximity of a diffraction angle 2θ=70 to 80° when a surface of the layer of the mixture of the graphite powder and the organic binder is measured by X-ray diffractometry with a Cu Kα ray as an X-ray source.

Diffraction peak intensity of (002) plane/diffraction peak intensity of (110) plane      formula (1)

The diffraction intensity ratio (002)/(110) can be rendered 500 or less by adjustment, for instance, a particle diameter of graphite powder, pressure applied when a negative electrode is prepared and the thermal expansion coefficient of a raw material of graphite powders appropriately. Furthermore, the diffraction intensity ratio (002)/(110) can be controlled when a shape change of powders and destruction thereof when a negative electrode is prepared are suppressed by controlling the number of fine pores inside of the graphite powder appropriately.

In a negative electrode for a lithium secondary battery according to the invention, the density of a mixture layer that is formed on a current collector and includes graphite powders and an organic binder is preferably in the range of 1.50 to 1.95 g/cm$^3$. The density is more preferably in the range of 1.55 to 1.90 g/cm$^3$, still more preferably 1.60 to 1.85 g/cm$^3$ and particularly preferably 1.65 to 1.80 g/cm$^3$.

When the density of a mixture layer that is formed including graphite powder and an organic binder on a current collector in a negative electrode according to the invention is made higher, the energy density per unit volume of a lithium secondary battery obtained with the negative electrode can be made larger. When the density of a mixture layer that is formed including the graphite powder and organic binder is less than 1.50 g/cm$^3$, the energy density per unit volume of a lithium secondary battery that is obtained tends to be smaller. On the other hand, when the density of a mixture layer that is formed including the graphite powders and an organic binder exceeds 1.95 g/cm$^3$, not only the charging property of an electrolytic solution when a lithium secondary battery is prepared tends to be deteriorated but also the rapid charge and discharge characteristics and cycle characteristics of a lithium secondary battery that is prepared tend to deteriorate.

Here, the density of a mixture layer that is formed including the graphite powders and organic binder can be calculated from a weight and a volume of a mixture layer that is formed including the graphite powders and organic binder.

The density of a mixture layer that is formed including the graphite powder and organic binder after integration can be appropriately controlled owing to, for instance, pressure when molding and integrating and a clearance of a machine such as a roll press and so on.

A value Lc (002), size of a crystallite in a C-axis direction of a crystal of graphite powder that is used in the invention is preferably 500 Å or more, more preferably 800 Å or more and particularly preferably in the range of 1000 to 10000 Å. When the crystallite size Lc (002) in a C-axis direction is less than 500 Å, the discharge capacity tends to be small.

Furthermore, an interlayer distance, d (002), of a crystal of graphite powder is preferably 3.38 Å or less, more preferably 3.37 Å or less and still further preferably 3.36 Å or less. Still furthermore, one close to complete graphite structure is preferable. When an interlayer distance, d (002), of a crystal exceeds 3.38 Å, the discharge capacity tends to deteriorate. The Lc (002) and d (002) can be measured by X-ray wide angle diffractometry.

Still furthermore, graphite powder that is used in a negative electrode for a lithium secondary battery according to the invention may be any one as far as a diffraction intensity ratio (002)/(110) measured by X-ray diffractometry of a mixture layer of graphite powders and an organic binder of a negative electrode can be set at 500 or less. For instance, scaly graphite, spherical graphite, graphite having a modified powder shape obtained by mechanically processing scaly graphite and a mixture of a plurality of materials can be used. However, graphite powder made of secondary powders obtained by agglomerating or binding a plurality of flat primary powders so that orientation planes may be non-parallel can be preferably used. These can be used singularly or in a combination of two or more kinds.

A flat powder in the invention indicates one having a shape that has a major axis and a minor axis, that is, one that is not a complete sphere. For instance, ones having a scaly shape, a scale-like shape and some of block-like shapes can be included therein. That, in graphite powder, orientation planes of a plurality of flat powders are non-parallel indicates a state where, a plurality of flat powders agglomerates or bonds without arranging the respective orientation planes in a constant direction to form graphite powder, with a flat surface, in other words, a surface most close to a flat surface as an orientation plane in each of powder shapes.

The bonding means a state where individual powders are chemically bonded through a carbonaceous material obtained by carbonizing a binder such as pitch, tar or the like, and the aggregation means a state where individual powders are not chemically bonded but maintain a shape as an aggregate even in a process of preparing a negative electrode owing to the shape thereof. From a point of view of the mechanical strength, bonded ones are preferable.

Furthermore, the graphite powder that is used in the invention has the aspect ratio preferably of 5 or less, more preferably in the range of 1.2 to 5, still more preferably 1.2 to 3 and particularly preferably 1.3 to 2.5. The graphite powder having the aspect ratio of 5 or less may be a secondary powder obtained by aggregating or bonding a plurality of primary powders, or one obtained by deforming one powder with the mechanical force so as to be 5 or less in the aspect ratio, furthermore one prepared by combining these.

When the aspect ratio exceeds 5, the diffraction intensity ratio (002)/(110) measured by means of the X-ray diffraction of a layer of a mixture containing graphite powders and an organic binder of the negative electrode tends to be larger. As a result, the rapid charge and discharge characteristics and cycle characteristics of the obtained lithium secondary battery tend to deteriorate. On the other hand, when the aspect ratio is less than 1.2, a contact area between powders decreases and thereby the electric conductivity of the prepared negative electrode tends to deteriorate.

The aspect ratio is expressed by A/B when a length in a major axis of a graphite powder is expressed with A and a length of a minor axis is expressed with B. The aspect ratio in the invention is obtained in such a manner that graphite powders are enlarged with an electron microscope, 10 graphite powders are arbitrarily selected therefrom, A/B is measured of each of these while varying an observation angle of an electron microscope, and an average value thereof is taken. When the graphite powder has a thickness direction like a scale-like shape, a plate-like shape and a block-like shape, a thickness is taken as a length B in a minor axis direction.

The graphite powder that is used in the invention is preferably one that is less in the shape change and destruction of the graphite powder, that is, can endure a mechanical processing in the course of preparing a negative electrode. When the graphite powder undergoes the shape change or destruction the diffraction intensity ratio (002)/(110) measured by the X-ray diffraction of a layer of a mixture containing graphite powders and an organic binder of a negative electrode tends to be larger, owing to an increase in the specific surface area or an orientation of graphite powder on an electrode. As a result, the charging and discharging efficiency, thermal stability, rapid charge and discharge characteristics and cycle characteristics of the obtained lithium secondary battery tend to deteriorate.

When a graphite powder is present as an aggregate or combination of a plurality of powders, the primary powder of the graphite powder is a powder unit recognized when the graphite powder is observed with for instance a scanning electron microscope (SEM). The secondary powder indicates a block formed by aggregated or bonded primary powders.

In one secondary powder, the number of flat primary powders that aggregate or bond each other is preferably 3 or more and more preferably 5 or more. A size of each of flat primary powders preferably contains powders in the range of 1 to 100 μm in a particle diameter, more preferably 5 to 80 μm and still more preferably 5 to 50 μm. The size of the flat primary powder is preferably two third or less of an average particle diameter of a secondary powder obtained through aggregation or bonding of these. Furthermore, the aspect ratio of each of flat primary powders is preferably 100 or less, more preferably 50 or less and still more preferably 20 or less. A preferable lower limit of the aspect ratio of the primary powder is 1.2; that is, one is preferable not to be spherical.

Furthermore, the specific surface area of the secondary powder is preferably 8 $m^2$/g or less and more preferably 5 $m^2$/g or less. When the secondary powder having the specific surface area of 8 $m^2$/g or less is used as the graphite powder in a negative electrode, the rapid charge and discharge characteristics and cycle characteristics of an obtained lithium secondary battery can be improved and furthermore the irreversible capacity at the first cycle can be made smaller. When the specific surface area exceeds 8 $m^2$/g, the irreversible capacity at the first cycle of an obtained lithium secondary battery tends to be larger, the energy density tends to be smaller and the larger amount of binder is necessary when a negative electrode is prepared. From a viewpoint of further improving the rapid charge and discharge characteristics and cycle characteristics of an obtained lithium secondary battery, the specific surface area is still more preferably in the range of 1.5 to 5 $m^2$/g and particularly preferably 2 to 5 $m^2$/g. The specific surface area can be measured by means of a BET method where for instance nitrogen gas absorption is used.

A manufacturing method according to the invention of a negative electrode for a lithium secondary battery is not restricted to particular one. For instance, at least an aggregate that can be graphitized or graphite and a binder that can be graphitized are mixed and pulverized, followed by mixing the pulverized material and 1 to 50% by weight of a graphitizing catalyst, further followed by sintering to obtain graphite powders. An organic binder and a solvent are added to the graphite powders and mixed, followed by coating the mixture on a current collector, further followed by drying to remove the solvent, and then pressurizing to integrate, thus a negative electrode for lithium secondary battery can be formed.

As the aggregate that can be graphitized, for instance, cokes, carbide of a resin and so on can be used. However, powder materials that can be graphitized are preferable. Among these, cokes powder such as needle cokes or the like that can be readily graphitized is preferable. As to the cokes that is used as the aggregate, the thermal expansion coefficient thereof is preferably in the range of $0.9 \times 10^{-6}$ to $7.0 \times 10^{-6}$/° C., more preferably $1.0 \times 10^{-6}$ to $6.5 \times 10^{-6}$/° C., still more preferably $1.2 \times 10^{-6}$ to $6.0 \times 10^{-6}$/° C. and particularly preferably $2.0 \times 10^{-6}$ to $6.0 \times 10^{-6}$/° C. When the thermal expansion coefficient is less than $0.9 \times 10^{-6}$/° C., the diffraction intensity ratio (002)/(110) measured by means of an X-ray diffractometer of a layer of a mixture containing graphite powders and an organic binder on a current collector of the negative electrode for a lithium secondary battery that is prepared tends to be larger. Furthermore, when the thermal expansion coefficient exceeds $7.0 \times 10^{-6}$/° C., the charge and discharge capacity of a prepared lithium secondary battery tends to decrease. Still furthermore, as the graphite, for instance, natural graphite powder and artificial graphite powder can be used. However, these are preferably powdery. A particle diameter of an aggregate that can be graphitized or graphite is preferably smaller than a particle diameter of graphite powder that is prepared. An average particle diameter thereof is preferably in the range of 1 to 80 μm, more preferably 1 to 50 μm and particularly preferably 5 to 50 μm. Furthermore, the aspect ratio of the aggregate that can be graphitized or graphite is preferably in the range of 1.2 to 500, more preferably 1.5 to 300, still more preferably 1.5 to 100 and particularly preferably 2 to 50. The aspect ratio is measured similarly to the method described above. When the aspect ratio of the aggregate that can be graphitized or graphite exceeds 500, the diffraction intensity ratio (002)/(110) measured by means of the X-ray diffractometer of a layer of a mixture containing graphite powders and an organic binder of the negative electrode tends to be larger, and, when the aspect ratio is less than 1.2, the discharge capacity per unit weight of graphite powder tends to be smaller.

As the binder, organic materials such as tar, pitch, a thermosetting resin, a thermoplastic resin and so on are preferable. A compounding amount of the binder to an aggregate that can be graphitized or graphite is preferably in the range of 5 to 80% by weight, more preferably 10 to 80% by weight, still more preferably 20 to 80% by weight and particularly preferably 30 to 80% by weight. When an amount of the binder is too much or too less, the aspect ratio and the specific surface area of graphite powder that is prepared tend to be larger. A method of mixing the aggregate that can be graphitized or graphite and the binder is not restricted to particular one; that is, for instance, a kneader can be used. The binder is mixed preferably at a temperature equal to or more than a softening temperature of the binder. Specifically, when the binder is pitch, tar or the like, a temperature in the range of 50 to 300° C. is preferable, and, when it is a thermosetting resin, a temperature in the range of 20 to 180° C. is preferable.

In the next place, the mixture is pulverized and the pulverized material is mixed with a graphitizing catalyst. A particle diameter of the pulverized material is preferably in the range of 1 to 100 μm, more preferably 5 to 80 μm, still more preferably 5 to 50 μm and particularly preferably 10 to 30 μm.

When the particle diameter of the pulverized material exceeds 100 μm, the specific surface area of graphite powder that is obtained tends to be larger, and, on the other hand, when it is less than 1 μm, the (002)/(110) ratio of a layer of a mixture containing graphite powders and an organic binder tends to be larger. Furthermore, a volatile content of the pulverized material is preferably in the range of 0.5 to 50% by weight, more preferably 1 to 30% by weight and still more preferably 5 to 20% by weight. The volatile content can be obtained from a reduction value of weight when the pulverized material is heated at 800° C. for 10 min. The graphitizing catalyst that is mixed with the pulverized material, as far as it has a function as a graphitizing catalyst, is not restricted to particular one. For instance, metals such as iron, nickel, titanium, silicon, boron and so on and carbides and oxides thereof can be used as the graphitizing catalyst. Among these, a compound of iron or silicon is preferable. Furthermore, as a chemical structure of the compound, carbide is preferable. An addition amount of the graphitizing catalyst is, with a total amount of the pulverized material that is mixed with the graphitizing catalyst and the graphitizing catalyst assigned to 100% by weight, preferably in the range of 1 to 50% by weight, more preferably 5 to 30% by weight and still more preferably 7 to 20% by weight. When the amount of the graphitizing catalyst is less than 1% by weight, not only a crystal of graphite powder that is prepared is poorly developed but also the specific surface area tends to be larger. When it exceeds 50% by weight, the graphitizing catalyst tends to remain with graphite powder that is prepared. The graphitizing catalyst that is used is preferably powdery and has an average particle diameter preferably in the range of 0.1 to 200 μm, more preferably 1 to 100 μm and particularly preferably 1 to 50 μm.

Subsequently, the mixture is sintered to graphitize. Before sintering, the mixture of the pulverized material and the graphitizing catalyst may be molded into a predetermined shape by use of a press machine or the like and sintered. In this case, molding pressure is preferably in the range of substantially 1 to 300 MPa. The mixture is preferably sintered in an atmosphere where the mixture is difficult to be oxidized. For instance, a method of sintering in a nitrogen atmosphere, an argon atmosphere, a vacuum atmosphere or a self-volatilizing atmosphere can be cited. A graphitizing temperature is preferably 2000° C. or higher, more preferably 2500° C. or higher, still more preferably 2700° C. or higher and particularly preferably in the range of 2800 to 3200° C. When the graphitizing temperature is low, a crystal of graphite is poorly developed, and thereby not only the discharge capacity tends to be small but also the added graphitizing catalyst tends to remain readily in the graphite powder that is prepared. When the graphitizing catalyst remains much in the graphite powder that is prepared, the discharge capacity per unit weight of the graphite powder tends to decrease. When the graphitizing temperature is too high, the graphite tends to sublimate. When a molded body obtained by molding into a predetermined shape with a press machine is sintered, the apparent density of the molded body after the graphitization is preferably 1.65 g/cm$^3$ or less, more preferably 1.55 g/cm$^3$ or less, still more preferably 1.50 g/cm$^3$ or less and particularly preferably 1.45 g/cm$^3$ or less. The lower limit thereof is preferably 1.00 g/cm$^3$ or more. When the apparent density of the molded body after the graphitization exceeds 1.65 g/cm$^3$, the specific surface area of the graphite powder that is prepared tends to be larger. When the apparent density of the molded body after the graphitization is less than 1.00 g/cm$^3$, not only the (002)/(110) ratio of a layer of a mixture containing graphite powders and an organic binder of the obtained negative electrode tends to be larger but also the handling property of the molded body after the graphitization tends to deteriorate. Furthermore, a furnace packing weight is reduced at the time of graphitization and the graphitizing process efficiency tends to deteriorate. The apparent density of the molded body after the graphitization can be calculated from measurements of a weight and a volume of the molded body after the graphitization. The apparent density of the molded body after the graphitization can be varied by appropriately controlling for instance the particle diameter of the pulverized material that is mixed with the graphitizing catalyst, pressure when molding into a predetermined shape by use of a press machine or the like.

Subsequently, the graphitized molded body was pulverized to control the particle diameter, and thereby graphite powder for forming a negative electrode is prepared. A pulverizing method is not restricted to particular one. For instance, an impact pulverizing method that uses for instance a jet mill, a hammer mill, a pin mill or the like can be cited. An average particle diameter of the graphite powder after the pulverization is preferably in the range of 1 to 100 μm, more preferably 5 to 50 μm and particularly preferably 10 to 30 μm. When an average particle diameter exceeds 100 μm, since the irregularity tends to be generated on a surface of a negative electrode that is prepared and thereby a lithium secondary battery that is prepared tends to cause micro-short-circuiting, the cycle characteristics tends to deteriorate.

The particle diameter in the invention can be measured with for instance a laser diffraction type particle distribution meter.

The obtained graphite powders are kneaded with an organic binder and a solvent to prepare a mixture, followed by appropriately controlling the viscosity thereof, further followed by coating on a current collector and drying, still further followed by pressurizing together with the current collector to integrate, thereby a negative electrode is formed.

The negative electrode may include a layer that adheres the current collector and the layer of the mixture containing the graphite powder and the organic binder therebetween as long as not disturbing an advantage of the invention.

Examples of the organic binder include polyethylene, polypropylene, ethylene-propylene terpolymer, butadiene rubber, styrene butadiene rubber, butyl rubber, a polymer large in the ionic conductivity and so on can be cited. These can be used singularly or in a combination of at least two kinds thereof.

As the polymer large in the ionic conductivity, for instance, polyvinylidene fluoride, polyethylene oxide, polyepichlorohydrin, polyphosphazene, polyacrylonitrile and so on can be used.

As to a mixing ratio of the graphite powders and the organic binder, the organic binder is preferably used in the range of 0.5 to 20 parts by weight relative to 100 parts by weight of the graphite powders.

The solvent is not restricted to particular one. For instance, N-methyl-2-pyrrolidone, dimethyl formaldehyde, isopropanol, water and so on can be cited. When water is used as the solvent, a viscosity improver is preferably used together. An amount of the solvent is not restricted particularly as far as desired viscosity can be obtained. Relative to 100 parts by weight of the mixture, 30 to 70 parts by weight are preferably used. These may be used singularly or in a combination of at least two kinds thereof.

As the current collector, a metal current collector such as a foil or mesh of nickel or copper can be used. In the integration, a molding method that uses a roll or a press machine can be used or a combination thereof can be used to integrate. Pressure in the integration is preferably in the range of substantially 1 to 200 MPa.

Thus obtained negative electrode can be used in a lithium secondary battery. A lithium secondary battery according to the invention, which includes a positive electrode containing a lithium compound and the negative electrode according to the invention, can be obtained by oppositely arranging the positive electrode and the negative electrode with a separator interposed therebetween, followed by injecting an electrolytic solution therebetween. The lithium secondary battery according to the invention is superior in a capacity, the cycle characteristics and the rapid charge and discharge characteristics to a lithium secondary battery that uses an existing negative electrode.

The positive electrode of the lithium secondary battery in the invention includes a lithium compound. The material thereof is not particularly restricted. For instance, $LiNiO_2$, $LiCoO_2$, $LiMn_2O_4$ and so on can be used singularly or in a combination thereof. Furthermore, a lithium compound where an element such as Co, Ni, Mn or the like is partially substituted by a different kind of element can be used as well. From a viewpoint of the energy density of the lithium secondary battery prepared in the invention, at least a lithium compound that contains Co is preferable and a lithium compound that contains Ni is more preferable. Furthermore, in the positive electrode that is used in the lithium secondary battery according to the invention, at least Co and Ni are particularly preferably contained. The positive electrode that contains Co and Ni may be one that is obtained by mixing $LiNiO_2$ and $LiCoO_2$ or one that is obtained with a lithium compound where a Ni element and/or a Co element are substituted. Normally, a lithium secondary battery that uses a Ni-containing lithium compound in a positive electrode has a problem in the deterioration of the discharge voltage. However, a lithium secondary battery where the positive electrode and the negative electrode according to the invention are combined can preferably inhibit the discharge voltage from deteriorating and improve the energy density.

A lithium secondary battery normally includes, together with a positive electrode and a negative electrode, an electrolytic solution that contains a lithium compound. As the electrolytic solution, an organic electrolytic solution where a lithium salt such as $LiClO_4$, $LiPF_6$, $LiAsF_6$, $LiBF_4$, $LiSO_3CF_3$, $CH_3SO_3Li$, $CF_3SO_3Li$ or the like is dissolved in a non-aqueous solvent such as ethylene carbonate, diethyl carbonate, dimethyl carbonate, methyl ethyl carbonate, propylene carbonate, acetonitrile, propylonitrile, dimethoxyethane, tetrahydrofuran, γ-butylolactone or the like or a solid or gel-like so-called polymer electrolyte can be used. These can be used singularly or in a combination of at least two kinds thereof.

Furthermore, in the electrolytic solution, a slight amount of an additive that shows a decomposition reaction at the time of first charging of the lithium secondary battery is preferably added. As the additive, for instance, vinylene carbonate, biphenyl, propanesultone and so on can be cited. An addition amount thereof is preferably in the range of 0.01 to 5% by weight.

As the separator, non-woven fabric cloth mainly made of polyolefin such as polyethylene or polypropylene, cloth, a microporous film or a combination thereof can be used. From a viewpoint of the rapid charge and discharge characteristics and the cycle characteristics of a lithium secondary battery that is prepared, a microporous film having the volume porosity of 80% or more is preferable. Furthermore, a thickness thereof is preferably in the range of 5 to 40 μm, more preferably 8 to 30 μm and particularly preferably 10 to 25 μm. When the thickness is less than 5 μm, the thermal stability of a lithium secondary battery that is prepared tends to deteriorate. On the other hand, when it exceeds 40 μm, the energy density and the rapid charge and discharge characteristics tend to deteriorate. When a structure where a positive electrode and a negative electrode of a lithium secondary battery that is prepared are not brought into direct contact is adopted, a separator does not need to be used.

In FIG. 1, a schematic diagram of a partial sectional front view of an example of a cylindrical lithium secondary battery is shown. In the cylindrical lithium secondary battery shown in FIG. 1, one where a positive electrode 1 processed into a sheet and a negative electrode 2 similarly processed are superposed with a separator 3 made of a polyethylene microporous film therebetween and are wound altogether, which is then inserted in a metal battery canister 7 and hermetically sealed. The positive electrode 1 is connected through a positive electrode tab 4 to a positive electrode cap 6 and the negative electrode 2 is connected through a negative electrode tab 5 to a battery bottom. The positive electrode cap 6 is fixed to the battery canister (positive electrode canister) 7 with a gasket 8.

EXAMPLES

In what follows, examples of the invention will be described.

Example 1

In the beginning, 50 parts by weight of cokes powder having an average particle diameter of 10 μm and 30 parts by weight of coal tar pitch were mixed at 230° C. for 2 hr. Subsequently, the mixture was pulverized to an average particle diameter of 25 μm. After that, 80 parts by weight of the pulverized material and 20 parts by weight of silicon carbide having an average particle diameter of 25 μm were mixed with a blender, followed by pouring the mixture into a die, further followed by molding with a press machine at 100 MPa to mold into a rectangular parallelepiped body. The molded body was heated at 1000° C. in a nitrogen atmosphere, followed by further heating at 3000° C. in a nitrogen atmosphere, and thereby a molded body of graphite was obtained. The molded body of graphite was pulverized to obtain graphite powders. With the obtained graphite powders, following measurements were carried out. (1) Average particle diameter due to a laser diffraction particle size distribution meter, (2) specific surface area due to a BET method, (3) aspect ratio (average value of 10 particles), (4) interlayer distance d (002) of a crystal due to X-ray wide angle diffraction and (5) crystallite size, Lc (002), in a C-axis direction of a crystal. Measurement values thereof are shown in Table 1.

The average particle diameter was measured with a laser diffraction particle size analyzer (trade name: SALD-3000, manufactured by Shimadzu Corp.). A particle diameter at 50% D was taken as an average particle diameter. An interlayer distance, d (002), was measured with an X-ray diffractometer where Cu—Kα line was monochromatized with a Ni filter and high purity silicon was used as a reference material. The specific surface area was determined by measuring, by use of a multi-points method with an ASAP 2010 (trade name, manufactured by Micromeritics Co., Ltd.), nitrogen absorption at a liquid nitrogen temperature, followed by calculating according to the BET method.

In the next place, 10% by weight, in terms of solid content, of an organic binder polyvinylidene fluoride (PVDF) dissolved in N-methyl-2-pyrohlidone was added to 90% by weight of the obtained graphite powders, and kneaded, and thereby a graphite paste was prepared. The graphite paste was coated on a rolled copper foil having a thickness of 10 μm, followed by drying at 120° C. to remove N-methyl-2-pyrohlidone, further followed by compressing at 10 MPa with a vertical press machine, and thereby a sample electrode (negative electrode) was obtained. (6) the density of a layer of a mixture of the graphite powders and PVDF of the sample electrode (negative electrode) was measured and found to be 1.20 g/cm$^3$ and a thickness thereof was found to be 96 μm. With an X-ray diffractometer, (002) and (110) diffraction peaks of a layer of a mixture of the graphite powders and the organic binder of the obtained test electrode (negative electrode) were measured and, from top intensities of the respective peaks, (7) (002)/(110) intensity ratio was measured. Results thereof are shown together in Table 1. In the X-ray diffractometry in (4), (5) and (7), an X-ray source was Cu Kα ray/40 KV/20 mA and a step width was set at 0.02°.

Figure 2:
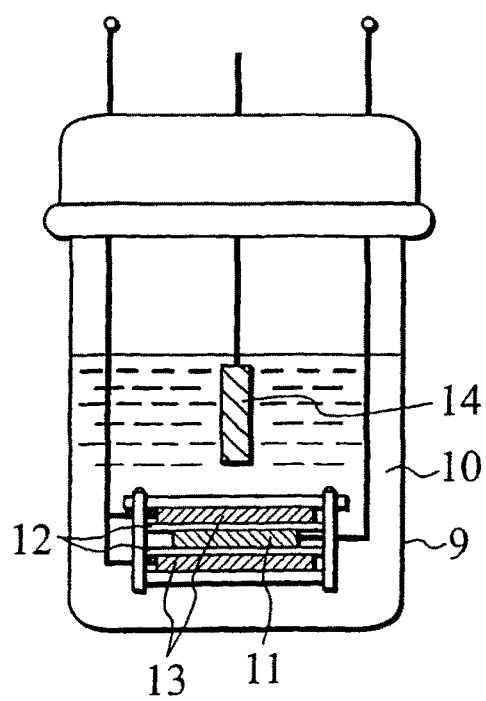
FIG. 2 is a schematic diagram of a lithium secondary battery that is used to measure the charge and discharge capacity and the discharge capacity retention rate in an example according to the invention.

The prepared sample electrode (negative electrode) was punched into a size of 2 cm$^2$, charged and discharged at a constant current with three terminal method, followed by measuring the charge and discharge capacity and the discharge capacity retention rate as shown below. In FIG. 2, a schematic diagram of a lithium secondary battery used in the measurement is shown. To evaluate a sample electrode (negative electrode), as shown in FIG. 2, a solution in which LiPF$_6$ was dissolved in a solvent mixture of ethylene carbonate (EC) and methyl ethyl carbonate (MEC) (volume ratio of EC/MEC=1/2) at a concentration of 1 mole/L was poured in a beaker type glass cell 9 as an electrolytic solution 10, and a sample electrode (negative electrode) 11, a separator 12 and a counter electrode (positive electrode) 13 were laminated and disposed, followed by hanging a reference electrode 14 from the above, and thereby a model battery was prepared. Lithium metal was used for the counter electrode (positive electrode) 13 and the reference electrode 14, and a polyethylene microporous film was used for the separator 12. With the obtained model battery, a test of charging at a constant current of 0.2 mA/cm$^2$ up to 0 V (V vs. Li/Li+) and discharging at a constant current of 0.2 mA/cm$^2$ up to 1 V (V vs. Li/Li+) with respect to an area of the sample electrode (negative electrode) was carried out between the sample electrode (negative electrode) 11 and the counter electrode (positive electrode) 13, and thereby (8) the discharge capacity per unit volume was measured.

Furthermore, according to a similar method, the charge and discharge were repeated 100 times, and thereby (9) the discharge capacity retention rate with the discharge capacity at the first cycle set at 100 was measured.

Still furthermore, a test of charging at a constant current of 0.2 mA/cm$^2$ up to 0 V (V vs. Li/Li+) and discharging at a constant current of 6.0 mA/cm$^2$ up to 1 V (V vs. Li/Li+) was carried out, and thereby (10) the discharge capacity retention rate with the discharge capacity at the discharge at a constant current of 0.2 mA/cm$^2$ set at 100 was measured.

The respective measurement results are shown together in Table 1.

Example 2

Except that pressure of the vertical press machine was set at, instead of 10 MPa, 23 MPa to make the density of the mixture layer of the graphite powder and PVDF 1.45 g/cm$^3$, a test electrode (negative electrode) was prepared according to a method similar to example 1, and a (002)/(110) intensity ratio, a discharge capacity per unit volume, a discharge capacity retention rate after 100 cycles and a discharge capacity retention rate under a discharge current of 6.0 mA/cm$^2$ were measured according to a method similar to example 1. The measurement results are shown together in Table 1.

Example 3

Except that pressure of the vertical press machine was set at 31 MPa to make the density of the mixture layer of the graphite powder and PVDF 1.55 g/cm$^3$, a test electrode (negative electrode) was prepared according to a method similar to example 1, and a (002)/(110) intensity ratio, a discharge capacity per unit volume, a discharge capacity retention rate after 100 cycles and a discharge capacity retention rate under a discharge current of 6.0 mA/cm$^2$ were measured according to a method similar to example 1. The measurement results are shown together in Table 1.

Example 4

Except that pressure of the vertical press machine was set at 50 MPa to make the density of the mixture layer of the graphite powder and PVDF 1.65 g/cm$^3$, a test electrode (negative electrode) was prepared according to a method similar to example 1, and a (002)/(110) intensity ratio, a discharge capacity per unit volume, a discharge capacity retention rate after 100 cycles and a discharge capacity retention rate under a discharge current of 6.0 mA/cm$^2$ were measured according to a method similar to example 1. The measurement results are shown together in Table 1.

Example 5

Except that pressure of the vertical press machine was set at 85 MPa to make the density of the mixture layer of the graphite powder and PVDF 1.75 g/cm$^3$, a test electrode (negative electrode) was prepared according to a method similar to example 1, and a (002)/(110) intensity ratio, a discharge capacity per unit volume, a discharge capacity retention rate after 100 cycles and a discharge capacity retention rate under a discharge current of 6.0 mA/cm$^2$ were measured according to a method similar to example 1. The measurement results are shown together in Table 1.

Example 6

Except that pressure of the vertical press machine was set at 143 MPa to make the density of the mixture layer of the graphite powder and PVDF 1.85 g/cm$^3$, a test electrode (negative electrode) was prepared according to a method similar to example 1, and a (002)/(110) intensity ratio, a discharge capacity per unit volume, a discharge capacity retention rate after 100 cycles and a discharge capacity retention rate under a discharge current of 6.0 mA/cm$^2$ were measured according to a method similar to example 1. The measurement results are shown together in Table 1.

Comparative Example 2

Except that pressure of the vertical press machine was set at 42 MPa to make the density of the mixture layer of the graphite powder and PVDF 1.65 g/cm$^3$, a test electrode (negative electrode) was prepared according to a method similar to example 7, and a (002)/(110) intensity ratio, a discharge capacity per unit volume, a discharge capacity retention rate after 100 cycles and a discharge capacity retention rate under a discharge current of 6.0 mA/cm$^2$ were measured according to a method similar to example 1. The measurement results are shown together in Table 1.

TABLE 1

| | Kind of Graphite | Average Particle Diameter (μm) | Specific Surface Area (m$^2$/g) | Aspect Ratio | d(002) (Å) | Lc(002) (Å) | Electrode density (g/cm$^3$) | X-ray diffraction intensity ratio (002)/(110) | Discharge capacity per unit volume (mAh/cm$^3$) | Discharge capacity retention rate after 100 cycles (%) | Discharge capacity retention rate at the discharge at 6.0 mA/cm$^2$ (%) |
|---|---|---|---|---|---|---|---|---|---|---|---|
| Example 1 | Artificial Graphite | 25 | 2.9 | 1.3 | 3.359 | More than 1000 | 1.20 | 98 | 426 | 95 | 96 |
| Example 2 | | | | | | | 1.45 | 126 | 516 | 94 | 93 |
| Example 3 | | | | | | | 1.55 | 138 | 544 | 93 | 88 |
| Example 4 | | | | | | | 1.65 | 170 | 574 | 89 | 85 |
| Example 5 | | | | | | | 1.75 | 188 | 593 | 82 | 83 |
| Example 6 | | | | | | | 1.83 | 198 | 604 | 78 | 80 |
| Example 7 | Natural Graphite | 26 | 8.6 | 15 | 3.355 | More than 1000 | 1.00 | 205 | 361 | 91 | 92 |
| Comparative Example 1 | | | | | | | 1.50 | 680 | 483 | 65 | 70 |
| Comparative Example 2 | | | | | | | 1.65 | 835 | 497 | 50 | 43 |

Example 7

Chinese natural graphite powder was pulverized with a jet mill and thereby scaly natural graphite powder was prepared.

Measurement results of an average particle diameter, a specific surface area, an aspect ratio, d(002) and Lc(002) of the graphite powder are shown together in Table 1. With the graphite powder, except that pressure of a vertical press machine was set at 2 MPa and thereby the density of a layer of a mixture of the graphite powder and PVDF was set at 1.00 g/cm$^3$, a test electrode (negative electrode) was prepared according to a method similar to example 1. According to a method similar to example 1, a (002)/(110) intensity ratio, a discharge capacity per unit volume, a discharge capacity retention rate after 100 cycles and a discharge capacity retention rate under a discharge current of 6.0 mA/cm$^2$ were measured. The measurement results are shown together in Table 1.

Comparative Example 1

Except that pressure of the vertical press machine was set at 27 MPa to make the density of the mixture layer of the graphite powder and PVDF 1.50 g/cm$^3$, a test electrode (negative electrode) was prepared according to a method similar to example 7, and a (002)/(110) intensity ratio, a discharge capacity per unit volume, a discharge capacity retention rate after 100 cycles and a discharge capacity retention rate under a discharge current of 6.0 mA/cm$^2$ were measured according to a method similar to example 1. The measurement results are shown together in Table 1.

As shown in Table 1, it is shown that a negative electrode according to the invention for a lithium secondary battery is high in the capacity, excellent in the cycle characteristics and rapid charge and discharge characteristics and can be suitably used in a lithium secondary battery.

INDUSTRIAL APPLICABILITY

According to the present invention, a negative electrode for a lithium secondary battery, which is excellent in the cycle characteristics and rapid discharge characteristics, can be obtained and can be suitably applied to a high capacity lithium secondary battery.

The invention claimed is:

1. A negative electrode for a lithium secondary battery comprising:
   a layer of a mixture containing graphite powder that has an average particle diameter in a range of 1 to 100 μm, a crystallite size Lc (002) in a C-axis direction of a crystal of at least 1000 Å, a specific surface area of at most 8 m$^2$/g, and an aspect ratio of at most 5, and an organic binder on a current collector,
   wherein an interlayer distance, d (002), of a crystal of the graphite powder is 3.36 Å or less,
   wherein a density of the layer of the mixture containing graphite powder and the organic binder is in a range of 1.5 to 1.95 g/cm$^3$, and
   wherein a diffraction intensity ratio (002)/(110) measured by X-ray diffractometry of the layer of the mixture is at most 500.

2. The negative electrode for a lithium secondary battery of claim 1, wherein a powder shape of the graphite powder is mechanically modified.

3. The negative electrode for a lithium secondary battery of claim 1, wherein the diffraction intensity ratio (002)/(110) measured by X-ray diffractometry of the layer of the mixture is in a range of 10 to 500.

4. The negative electrode for a lithium secondary battery of claim 1, wherein the diffraction intensity ratio (002)/(110) measured by X-ray diffractometry of the layer of the mixture is in a range of 10 to 300.

5. The negative electrode for a lithium secondary battery of claim 1, wherein the diffraction intensity ratio (002)/(110) measured by X-ray diffractometry of the layer of the mixture is in a range of 50 to 200.

6. A lithium secondary battery comprising:
a negative electrode for a lithium secondary battery of claim 1; and
a positive electrode containing a lithium compound.

7. The lithium secondary battery of claim 6, wherein the lithium compound contains at least Ni.

8. The lithium secondary battery of claim 6, wherein the diffraction intensity ratio (002)/(110) measured by X-ray diffractometry of the layer of the mixture is in a range of 10 to 500.

9. The lithium secondary battery of claim 6, wherein the diffraction intensity ratio (002)/(110) measured by X-ray diffractometry of the layer of the mixture is in a range of 10 to 300.

10. The lithium secondary battery of claim 6, wherein the diffraction intensity ratio (002)/(110) measured by X-ray diffractometry of the layer of the mixture is in a range of 50 to 200.

11. The negative electrode for a lithium secondary battery of claim 1, wherein the graphite powder has aspect ratio of 1.2 to 3.

12. The negative electrode for a lithium secondary battery of claim 1, wherein the graphite powder has aspect ratio of 1.2 to 2.5.

13. The negative electrode for a lithium secondary battery of claim 1, wherein the crystallite size Lc (002) in a C-axis direction of a crystal is in a range of 1000 to 10000 Å.

14. The negative electrode for a lithium secondary battery of claim 1, wherein the density of the layer of the mixture containing graphite powder and the organic binder is at least 1.65 g/cm$^3$.

15. The lithium secondary battery of claim 6, wherein a discharge capacity retention rate of the lithium secondary battery after 100 cycles is at least 78% and a discharge capacity retention rate of the lithium secondary battery under a discharge current of 6.0 mA/cm$^2$ is at least 80%.

16. A graphite powder comprising graphite particles having an average particle diameter in a range of 1 to 100 μm, a crystallite size Lc (002) in a C-axis direction of a crystal of at least 1000 Å, a specific surface area of at most 8 m$^2$/g, and an aspect ratio of at most 5, wherein an interlayer distance, d (002), of a crystal of the graphite powder is 3.36 Å or less and a diffraction intensity ratio (002)/(110) measured by X-ray diffractometry of a layer of a mixture of the graphite powder and a binder is at most 500 when a density of the layer is in a range of 1.5 to 1.95 g/cm$^3$.

17. The graphite powder of claim 16, wherein a powder shape of the graphite powder is mechanically modified.

18. The graphite powder of claim 16, wherein the diffraction intensity ratio (002)/(110) measured by X-ray diffractometry of the layer of the mixture is in a range of 10 to 500 when a density of the layer is in a range of 1.5 to 1.95 g/cm$^3$.

19. The graphite powder of claim 16, wherein the diffraction intensity ratio (002)/(110) measured by X-ray diffractometry of the layer of the mixture is in a range of 10 to 300 when a density of the layer is in a range of 1.5 to 1.95 g/cm$^3$.

20. The graphite powder of claim 16, wherein the diffraction intensity ratio (002)/(110) measured by X-ray diffractometry of the layer of the mixture is in a range of 50 to 200 when a density of the layer is in a range of 1.5 to 1.95 g/cm$^3$.

21. The graphite powder of claim 16, wherein the graphite powder has aspect ratio of 1.2 to 3.

22. The graphite powder of claim 16, wherein the graphite powder has aspect ratio of 1.2 to 2.5.

23. The graphite powder of claim 16, wherein the crystallite size Lc (002) in a C-axis direction of a crystal is in a range of 1000 to 10000 Å.

24. The graphite powder of claim 16, wherein the diffraction intensity ratio (002)/(110) measured by X-ray diffractometry of a layer of a mixture of the graphite powder and a binder is at most 500 when a density of the layer is in a range of 1.65 to 1.95 g/cm$^3$.

* * * * *